United States Patent [19]

Patel

[11] Patent Number: 5,041,313

[45] Date of Patent: Aug. 20, 1991

[54] METHOD FOR MAKING SILICONE HARDCOAT COMPOSITES AND PRIMER COMPOSITIONS

[75] Inventor: Gautam A. Patel, Clifton Park, N.Y.

[73] Assignee: General Electric Company, Schenectady, N.Y.

[21] Appl. No.: 649,505

[22] Filed: Feb. 1, 1991

Related U.S. Application Data

[62] Division of Ser. No. 521,870, May 11, 1990.

[51] Int. Cl.$^5$ .............................................. B05D 3/02
[52] U.S. Cl. .................................. 427/379; 427/387; 427/393.5; 427/412.1; 428/412; 524/365
[58] Field of Search .................. 427/379, 387, 393.5, 427/412.1, ; 428/412; 524/365

[56] References Cited

U.S. PATENT DOCUMENTS

| | | | |
|---|---|---|---|
| 3,446,769 | 5/1969 | Opipari | 260/31.4 |
| 4,382,109 | 5/1983 | Olson et al. | 427/385.5 X |
| 4,395,463 | 7/1983 | Kray | 428/447 |
| 4,562,219 | 12/1985 | Frye | 524/364 X |
| 4,624,870 | 11/1986 | Anthony | 427/387 |
| 4,863,520 | 9/1989 | Factor et al. | 106/287.12 |

FOREIGN PATENT DOCUMENTS 680815 2/1964 Canada.

*Primary Examiner*—Michael Lusignan
*Attorney, Agent, or Firm*—William A. Teoli; James C. Davis, Jr.; William H. Pittman

[57] ABSTRACT

A method is provided for making a silicone hardcoat-thermoplastic composite, such as a silicone-polycarbonate composite utilizing a solution of a polyacrylic resin and a solvent blend of a strong and weak solvent as determined by the solubility characteristics of the polyacrylic resin in the respective solvents. The primer composition allows for a direct wet-on-wet application of the primer onto an aromatic thermoplastic substrate followed by the application of the silicone hardcoat composition which eliminates a baking and cooling step in the formation of the silicone hardcoat-aromatic thermoplastic substrate composite.

8 Claims, No Drawings

METHOD FOR MAKING SILICONE HARDCOAT COMPOSITES AND PRIMER COMPOSITIONS

This application is a division of application Ser. No. 521,870 filed May 11, 1990.

BACKGROUND OF THE INVENTION

The present invention relates to the employment of a solution of a polyacrylic resin in a mixture of organic solvents as a primer composition to treat aromatic organic thermoplastic substrates. More particularly, the present invention relates to a method for applying a silicone hardcoat composition onto a primed aromatic thermoplastic substrate and to acrylic primer compositions used in such method.

Prior to the present invention, composites of silicone hardcoat compositions on an aromatic thermoplastic substrate, such as a polycarbonate substrate were made by initially priming the surface of the thermoplastic substrate with a thermally dried or baked acrylic primer which is shown in U.S. Pat. Nos. 4,242,381 and 4,284,685 which are incorporated herein by reference. Generally, an organic solvent solution or emulsion of a thermosetting acrylic resin with an ultraviolet light absorbing agent is applied onto the surface of the aromatic thermoplastic substrate and baked for one hour at 120° to 125° C. Additional heat cured acrylic primer compositions are shown by U.S. Pat. No. 4,486,565 and 4,382,109 which also are incorporated herein by reference. In a typical process, a primer is applied onto the aromatic thermoplastic substrate, air dried for 15 minutes and then baked for 15-60 minutes at about 125° C. The treated part is then allowed to cool to room temperature for about 15 minutes and then coated with the silicone hardcoat composition. The overall processing time can be 2 hours or more where the thermally baked primer usually requires 2 sets of application chambers and ovens for the dual coat process.

It would be desirable therefore to provide alternate procedures for applying abrasion resistant silicone hardcoat composition onto aromatic thermoplastic substrates which do not require an extensive bake or cure time for the primer, followed by a cooling period. Such procedures would substantially reduce the overall processing time for making silicone hardcoat-thermoplastic substrate composites.

SUMMARY OF THE INVENTION

The present invention is based on the discovery that an aromatic thermoplastic substrate, such as a polycarbonate substrate can be effectively primed without a baking step. There can be used a solution of a polyacrylic resin, which hereinafter means a polyacrylic acid, a polyacrylic ester, and copolymers of monomers represented by the general formula,

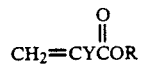

where Y is H, methyl or ethyl, and R is a $C_{(1-12)}$ alkyl radical. In addition, the polyacrylic resin can be thermoplastic or thermosetting. There can be used, for example, a solution of a polymethyl methacrylate (PMMA) in a solvent blend of a fast evaporating "weak solvent" as defined hereinafter, for example a propylene glycol methyl ether, and a slower evaporating "strong" solvent as defined hereinafter, for example diacetone alcohol. It has been further found that this "wet-on-wet" primer coating composition of the present invention, which means that the silicone hardcoat can be directly applied onto a primed thermoplastic substrate without a baking step, can provide a satisfactory initial adhesion and a long term adhesion of the silicone hardcoat onto the aromatic thermoplastic substrate. Reference to the solubility of the polyacrylic resin in a particular solvent, as defined hereinafter, with respect to the "strength" of a particular solvent, will be defined in accordance with the standards used by the United States Pharmacopeia as follows:

| USP SOLUBILITY CLASSIFICATION | |
|---|---|
| Description | Parts of solvent required for 1 part of solute |
| Very soluble | Less than 1 |
| Freely soluble | 1-10 |
| Soluble | 10-30 |
| Sparingly soluble | 30-100 |
| Slightly soluble | 100-1,000 |
| Very slightly soluble | 1,000-10,000 |
| Practically insoluble or insoluble | 10,000+ |

STATEMENT OF THE INVENTION

There are provided by the present invention, thermoplastic primer compositions comprising by weight
(A) a polyacrylic resin and,
(B) 90 to 99 parts, per part of (A) of an organic solvent blend comprising,
  (i) 5 to 25% of a strong solvent having a boiling point of 150 to 200° C. at ambient conditions, wherein (A) is freely soluble, and
  (ii) 75 to 95% by weight of a weaker solvent having a boiling point of 90 to 150° C. under ambient conditions, wherein (A) is soluble.

In a further aspect of the present invention, there is provided a method for making a composite of an aromatic thermoplastic substrate and a silicone hardcoat which comprises,
(C) treating the surface of an aromatic thermoplastic substrate with a primer composition under ambient conditions,
(D) allowing the treated aromatic thermoplastic substrate to dry under ambient conditions,
(E) treating the primed thermoplastic substrate with a silicone hardcoat composition to produce a wet-on-wet composite of the silicone hardcoat and aromatic thermoplastic substrate,
(F) allowing the composite of (E) to dry under ambient conditions, and
(G) baking the composite of (F) at a temperature of 90 to 150° C. to produce a composite of a silicone hardcoat on an aromatic thermoplastic substrate, where the primer composition of (C) comprises by weight, (A) polyacrylic resin and,(B) 90 to 99 parts, per part of (A) of an organic solvent blend comprising,
  (i) 5 to 25% of a strong solvent having a boiling point of 150 to 200° C. at ambient conditions, wherein (A) is freely soluble, and
  (ii) 75 to 95% by weight of a weaker solvent having a boiling point of 90 to 140° C. under ambient conditions, wherein (A) is soluble,
and the silicone hardcoat composition of (E) has a pH of about 7.1 to about 7.8 and comprises by weight about 10-50% solids dispersed in a water/alcohol solution, where the solids comprise 10–70% colloidal silica in combination with 30–90% of a partial condensate of organotriakloxy silane of the formula $R^1Si(OR^2)_3$, $R^1$ is a $C_{(1-3)}$ alkyl radical and $R^2$ is selected from the same or different $C_{(1-8)}$ alkyl radical.

Strong, slower evaporating organic solvents, which can be used in the practice of the present invention as part of the primer composition are for example, diacetone alcohol, diisobutyl ketone, diisoamyl ketone, isophorone, dipropylene and diethylene glycol methyl ether (Dowanol DPM and and methyl carbitol of Union Carbide) and mixtures thereof, which boil within 150° to 200° C. at ambient temperatures.

More volatile weaker solvents and mixtures thereof which boil within 90° to 150° C. which can be used as part of the primer composition of the present invention are propylene glycol monomethyl ether, propylene glycol monopropyl ether (Dowanol ® PM of the Dow Chemical Company), ethylene glycol ethyl ether (cellosolve) ethylene glycol methyl ether (methyl cellosolve) and propylene glycol monopropyl ether (Proposol P of the Union Carbide Corporation).

Other optional solvents with an appropriate degree of volatility and solubility are for example, glycol ether acetates, such as propylene glycol monomethyl ether acetate.

Aromatic thermoplastic substrates which can be used in the practice of the present invention to make the silicone hardcoat-aromatic thermoplastic substrate composites are preferably aromatic polycarbonates, such as Lexan polycarbonate of the General Electric Company. In addition other aromatic thermoplastic substrates also can be used, such as blends of polyphenylene ether and polystyrene, polyetherimides, polyesters and polysulfones.

The silicone-hardcoat compositions which can be used in the practice of the present invention are preferably colloidal silica filled silicone compositions as described by U.S. Pat. No. 4,624,870 which is incorporated herein by reference. The weathering performance of these silicone hardcoats can be improved by using UV light absorbing agents which are described by Ashby et al, U.S. Pat. Nos. 4,278,804, 4,374,674 and 4,419,405, Frye, U.S. Pat. No. 4,299,746 and by Anthony, U.S. Pat. Nos. 4,495,360 and 4,525,426 which are incorporated herein by reference. In addition, the silicone hardcoat composition can be catalyzed with tetra-n-butylammonium acetate (TBAA) to reduce the topcoat cure time, as shown in U.S. Pat. No. 4,863,520 which is incorporated herein by reference. UV absorbers which can be used in the primer composition are for example, 2,4-dihydroxybenzophenone, 2-hydroxy-4-methoxybenzophenone, 2,2'-dihydroxy-4-methoxybenzophenone, 2-hydroxy-n-octoxybenzophenone, 2-hydroxy-4-dodecyloxybenzophenone, 2-(2-hydroxy-5-methylphenyl)benzotriazole, 2-(2-hydroxy-5-t-octylphenyl)benzotriazole, 2-(2-hydroxy-3,5-di-tert-butylphenyl)benzotriazole, ethyl-2-cyano-3,3-diphenyl acrylate, 2-ethylhexy12-cyano-3,3-diphenyl acrylate and polymer of 4-(2-acryloxyethoxy)-2 hydroxybenzophenone. The primer composition may contain other additives or stabilizers such as antioxidants, hindered amines, dyes or colloidal inorganic fillers.

Additionally the silicone hardcoat compositions can contain silylated UV absorbers, such as 4-[gamma-(tri(methoxy/ethoxy)silyl)propoxy]-2- hydroxy benzophenone Further examples of polyacrylic resins which can be used in the primer compositions are shown in the Encylopedia of Polymer Science & Technology, Vol. 1, Interscience Publishers, John Wiley & Sons, Inc. (1964), page 246. Additional acrylic acid ester monomers are for example, methyl acrylate, isopropyl acrylate, n-propyl acrylate, n-butyl acrylate, isobutyl acrylate, sec-butyl acrylate, 2-ethylhexyl acrylate, etc. Exemplary methacrylic acid ester monomers are for example, methyl methacrylate, ethyl methacrylate, n-butyl methacrylate, isobutyl methacrylate, hexyl methacrylate, etc.

Copolymers of the above acrylate and/or methacrylate monomers are also included within the term "thermoplastic acrylic polymers" as it appears herein. The polymerization of the monomeric acrylic acid esters and methacrylic acid esters provide thermoplastic polyacrylic resins useful in the practice of the invention may be accomplished by any of the well known polymerization techniques. Thermoplastic polyacrylic resins can have a molecular weight of at least about 15,000 and are generally preferred in the practice of the instant invention.

The thermoplastic primer composition can be applied onto the aromatic thermoplastic substrate by anyone of the well known methods, such as spraying, dipping, rollcoating and the like. Sufficient primer composition should be used to provide a thickness of from about 0.002 mil to about 1

The primed thermoplastic substrate then can be further treated with the silicone hardcoat composition to provide a hardcoat thickness of from about 0.1 to about 0.5 mil and preferably 0.15 to about 0.4 mil.

The silicone hardcoat composites made in accordance with the invention can be used in various applications, such as windshields, lamp envelopes, and safety glasses.

In order that those skilled in the art will be better able to practice the present invention the following examples are given by way of illustration and not by way of limitation. All parts are by weight.

EXAMPLE 1

A series of wet-on-wet type primer compositions were prepared by dissolving 1 to 2 parts of a thermoplastic polyacrylic resin in a solvent blend consisting of 85 parts of propylene glycol methyl ether and 15 parts of diacetone alcohol. The mixtures were heated to 70° C. for about 2 hours to completely dissolve the polyacrylic resin. There were added to the respective solutions various UV screens, such as 2,4-dihydroxybenzophenone (DHBP), cyanoacrylate and a copolymer of alkyl methacrylate and methacrylic benzophenone. The respective wet-on-wet primer compositions, designated A, B, C, D, E F and G are shown below in Table 1

TABLE 1

Wet on Wet Primer Compositions
(All parts by weight)

| | A | B | C | D | E | F | G |
|---|---|---|---|---|---|---|---|
| Elvacite ® 2041[1] | 1 | 2 | 2 | 1 | 2.3 | — | 1 |
| Elvacite ® 2042[2] | — | — | — | — | — | 1 | — |
| Uvinul ®-400[3] | 2 | 2 | 0.5 | — | — | 2 | — |
| Uvinul ® N-539[4] | — | — | — | 0.25 | — | — | — |
| Copolymer ® 78-6121[5] | — | — | — | — | 0.7 | — | — |
| Dowanol ® PM[6] | 85 | 85 | 85 | 85 | 85 | 85 | 85 |

TABLE 1-continued

Wet on Wet Primer Compositions
(All parts by weight)

| | A | B | C | D | E | F | G |
|---|---|---|---|---|---|---|---|
| Diacetone Alcohol | 15 | 15 | 15 | 15 | 15 | 15 | 15 |

[1] High molecular weight polymethyl methacrylate (PMMA), acrylic resin of the E. S. DuPont de Nemours Co.
[2] High molecular weight polyethyl methacrylate (PEMA), acrylic resin of the E. S. DuPont de Nemours Co.
[3] UV absorber. 2,4 Dihydroxybenzophenone, of the BASF Corp.
[4] UV absorber, Cyanoacrylate, BASF Corp.
[5] UV absorber polymeric. 1:1 weight copolymer of alkyl methacrylate and methacrylic benzophenone, National Starch and Chemical Corp.
[6] Solvent. Propylene glycol monomethyl ether, Dow Chemical Co.

Lexan polycarbonate panels (6 inches by 12 inches by ⅛ inch) were flow coated with the above primer compositions A, D, F and G and air dried for 15 minutes. The primed panels were then flow coated with a commercially available silicone hardcoat composition in the form of a colloidal silica filled methylpolysiloxane. The silicone hardcoat was made as follows:

There was mixed 203 grams of methyltrimethoxysilane with 1.25 grams of glacial acetic acid. There was added 41.5 grams of deionized water to 125.5 grams of Ludox AS (ammonium-stabilized collodal silica sol, 40% $SiO_2$ having a silica particle diameter of about 22 millimicrons and a pH of 9.2) to reduce the $SiO_2$ level to 30 weight percent. The diluted silica sol was then added to the acidified methyltrimethoxysilane with stirring. The resulting solution was then stirred for another 16–18 hours at room temperature followed by the addition of 370 grams of a 1:1 (by weight) isopropanol/n-butanol solvent blend and 19 grams of the UV abosrber. The mixture was then stirred for about 2 weeks at room temperature. The composition as formulated had 20% by weight solids, and contained 11% by weight of the UV absorber, based on calculated solids. The composition had a viscosity of about 5 centistokes at room temperature.

The respective treated panels were then air dried for 15 minutes and cured for 60 minutes at 128° C. A control panel was also prepared following the same procedure, except that a commercial thermally baked polyethylmethacrylate (PEMA) primer (shown in U.S. Pat. No. 4,382,109) was used which required a baking step for 15 minutes at 128° C. and a cooling period of about 15 minutes prior to applying the afore described silicone hardcoat composition. The dried primer thickness has a thickness of about 0.1 to 2 microns, and the hardcoat thickness is about 3–20 microns.

The respective silicone hardcoat composites were then evaluated for silicone hardcoat adhesion by immersing the respective composites for 7 days under water at 65° C. Adhesion results are shown in Table 2 below, where LHP-100 is a thermally baked commercial primer, and 2,4 DHBP is 2,4-dihydroxybenzophenone.

TABLE 2

Properties of Silicone Hardcoat on Various Primers

| Primer | Acrylic Resin/ UV Screen | Application | Taber Abrasion Resistance % Haze (500 Cycles) | Scribed Adhesion Failure time After Water Immersion Test at 65° C. (Days) |
|---|---|---|---|---|
| A | PMMA/2,4 DHBP | Wet on Wet | 5.7 | >7 |
| D | PMMA/Cyano-acrylate | Wet on Wet | 4.7 | >7 |
| F | PEMA/2,4 DHBP | Wet on Wet | 6.5 | 1 |
| G | PMMA/None | Wet on Wet | 3.5 | >7 |
| Commercial | PEMA/2,4 DHBP | Thermally Baked | 5.3 | >7 |
| Commercial | PEMA/2,4 DHBP | Wet on Wet | 5.8 | 1 |

The above results show that the wet-on-wet primer compositions A, D and G exhibit excellent resistance to loss of scribed adhesion after the 7 day immersion period which is substantially equivalent to the composite using the thermally baked commercial primer.

The scribed adhesion of primer and top coat was evaluated by using crosshatch tape test. The coating was cut into a grid pattern of 100 squares of 1 millimeter size and adhesion checked by adhering a 3M-610 scotch tape and quickly pulling it off. Removal of any square of coating is considered a failure.

The wet-on-wet method for making silicone hardcoat thermoplastic substrate composites was further evaluated by treating Lexan panels as previously described with the primer compositions A, B, C, D, and F and allowing the treated panels to air dry for 5 minutes under ambient conditions at about 35% R.H. and 75° F. The primed panels were then flow coated with the commercial silicone hardcoat resin catalyzed with 0.2 wt. % (based on solids) of tetra-n-butylammonium acetate. The primed panels were air dried for 15 minutes and cured for 15 minutes at 128° C. The total processing time was 35 minutes as compared to the 90 minutes previously described. All coatings were optically clear and showed 89.5% light transmission and had very low haze values of about 0.1 to 0.2%. A control sample was prepared using the thermally baked commercial primer which was baked for 15 minutes at 128° C. and allowed to cool to room temperature for about 10–15 minutes prior to the application of the silicone hardcoat. The following results were obtained:

TABLE 3

Properties of Silicone Hardcoat on Various Primers

| Primer | Acrylic Resin/ UV Screen | Application | Taber Abrasion Resistance % Haze (500 Cycles) | Scribed Adhesion Failure time After Water Immersion Test at 65° C. (Days) |
|---|---|---|---|---|
| A | PMMA/2,4 DHBP | Wet on Wet | 7.3 | >20 |
| B | PMMA/2,4 DHBP | Wet on Wet | 6.3 | >20 |
| C | PMMA/2,4 DHBP | Wet on Wet | 6.0 | >20 |
| D | PMMA/Cyano-acrylate | Wet on Wet | 5.5 | >20 |

TABLE 3-continued

| Primer | Acrylic Resin/ UV Screen | Application | Taber Abrasion Resistance % Haze (500 Cycles) | Scribed Adhesion Failure time After Water Immersion Test at 65° C. (Days) |
| --- | --- | --- | --- | --- |
| F | PEMA/2,4 DHBP | Wet on Wet | 10.1 | Failed Initial Scribed Adhesion |
| Commercial | PEMA/2,4 DHBP | Thermally Baked | 6.2 | 9 |
| Commercial | PEMA/2,4 DHBP | Wet on Wet | 11.5 | Failed Initial Scribed Adhesion |

The above results show that all of the silicone hardcoat-polycarbonate composites utilizing primers A, B, C and D were found to be superior or more durable as a result of 20 days of water immersion at 65° C. These silicone hardcoat-polycarbonate composites also exhibited good Taber abrasion resistance. In addition, the coatings also provided outstanding weathering properties establishing their resistance to moisture, UV light and thermal cycling stresses. The accelerated weathering properties were measured with a QUV accelerated weatherometer (Q-Panel Co.) where the weathering cycle consisted of 8 hours of exposure to UV light with UV-B fluorescent FS-40 lamps at 70° C. and 4 hours of moisture condensation in dark at 50° C. The silicone hardcoat (catalyzed with 0.4% TBAA and cured for 15 minutes at 130° C.) on two wet-on-wet primers D and E exhibited excellent weathering performance and failed by delamination mode after about 4350 hours without any prior occurrence of microcracking or hazing.

Although the above example is directed to only a few of the very many variables which can be used in the practice of the method and for making the primer compositions of the present invention, it should be understood that the present invention is directed to a much broader variety of wet-on-wet primer compositions as well as methods for making silicone hardcoat-aromatic thermoplastic substrate composites.

What is claimed is:

1. A method for making a composite of an aromatic thermoplastic substrate and a silicone hardcoat which comprises,
   (C) treating the surface of an aromatic thermoplastic substrate with a primer composition under ambient conditions,
   (D) allowing the treated aromatic thermoplastic substrate to dry under ambient conditions,
   (E) treating the primed thermoplastic substrate with a colloidal silica filled silicone hardcoat composition to produce a wet-on-wet composite of the silicone hardcoat and aromatic thermoplastic substrate,
   (F) allowing the composite of (E) to dry under ambient conditions, and
   (G) baking the composite of (F) at a temperature of 90 to 150° C., to produce a silicone hardcoat-aromatic thermoplastic substrate composite, where the primer composition of (C) comprises by weight, (A) polyacrylic resin and,(B) 90 to 99 parts, per part of (A) of an organic solvent blend comprising,
   (i) 5 to 25% of a strong solvent having a boiling point of 150° to 200° C. at ambient conditions, wherein (A) is freely soluble, and
   (ii) 75 to 95% of a weaker solvent having a boiling point of 90 to 150° C. under ambient conditions, wherein (A) is soluble,
and the silicone hardcoat composition of (E) has a pH of about 7.1 to about 7.8 and comprises by weight about 10–50% solids dispersed in a water/alcohol solution, where the solids comprise 10–70% colloidal silica in combination with 30–90% of a partial condensate of an organotrialkoxy silane of the formula $R^1Si(OR^2)_3$, $R^1$ is a $C_{(1-3)}$ alkyl radical and $R^2$ is selected from the same or different $C_{(1-8)}$ alkyl radical.

2. A method in accordance with claim 1, where the aromatic thermoplastic substrate is a polycarbonate substrate.

3. A method in accordance with claim 1, where the polyacrylic resin is a polymethyl methacrylate.

4. A method in accordance with claim 1, where the polyacrylic resin is a polyethyl methacrylate.

5. A method in accordance with claim 1, where the primer composition and the colloidal silica filled-hardcoat composition, contains a UV absorber.

6. A method in accordance with claim 1, where the organotrialkoxy silane of the partial condensate is methyltrimethoxysilane.

7. A method in accordance with claim 1, where the strong solvent is a member selected from the class consisting of diacetone alcohol, diisobutyl ketone, diisoamyl ketone, isophorone, dipropylene glycol methyl ether, and mixtures thereof which boil at 150° C. to 200° C.

8. A method in accordance with claim 1, where the weak solvent is a member selected from the class consisting of propylene glycol monomethyl ether, propylene glycol monopropyl ether, ethylene glycol methyl ether, ethylene glycol ethyl ether, and mixtures thereof which boil at 90° C. to 150° C.

* * * * *